US010565395B2

(12) United States Patent
Matusek et al.

(10) Patent No.: US 10,565,395 B2
(45) Date of Patent: Feb. 18, 2020

(54) METHODS AND APPARATUS FOR USING VIDEO ANALYTICS TO DETECT REGIONS FOR PRIVACY PROTECTION WITHIN IMAGES FROM MOVING CAMERAS

(71) Applicant: KiwiSecurity Software GmbH, Vienna (AT)

(72) Inventors: Florian Matusek, Vienna (AT); Klemens Kraus, Vienna (AT); Stephan Sutor, Vienna (AT); Ádám Erdélyi, Gyorújbarát (HU); Georg Zankl, Vienna (AT)

(73) Assignee: Kiwi Security Software GMBH, Vienna (AT)

( * ) Notice: Subject to any disclaimer, the term of this patent is extended or adjusted under 35 U.S.C. 154(b) by 0 days.

(21) Appl. No.: 15/418,176

(22) Filed: Jan. 27, 2017

(65) Prior Publication Data

US 2017/0220816 A1 Aug. 3, 2017

Related U.S. Application Data

(60) Provisional application No. 62/288,762, filed on Jan. 29, 2016.

(51) Int. Cl.
*G06F 21/62* (2013.01)
*G06K 9/00* (2006.01)
(Continued)

(52) U.S. Cl.
CPC ..... *G06F 21/6245* (2013.01); *G06K 9/00288* (2013.01); *G06K 9/00718* (2013.01);
(Continued)

(58) Field of Classification Search
CPC ......... G08B 13/19686; G06K 9/00771; G06K 9/00362; G06K 9/00268; G06K 9/00281;
(Continued)

(56) References Cited

U.S. PATENT DOCUMENTS 2,952,075 A * 9/1960 Davis ..................... G01C 11/04
33/1 A
3,740,153 A * 6/1973 Wood ................... G02B 27/642
356/256
(Continued)

FOREIGN PATENT DOCUMENTS

JP 2005-286468 A * 10/2005
JP 2016-208127 A * 12/2016
(Continued)

OTHER PUBLICATIONS

Taniguchi et al., Machine generated translation of JP 2005-286468 A, Oct. 2005.*
(Continued)

*Primary Examiner* — David E Harvey
(74) *Attorney, Agent, or Firm* — Cooley LLP

(57) ABSTRACT

In some embodiments, an apparatus includes a memory and a processor. The processor is configured to receive a set of images associated with a video recorded by a moving or a non-moving camera. The processor is configured to detect a structure of a region of interest from a set of regions of interest in an image from the set of images. The processor is configured to classify the structure into a geometric class from a set of predefined geometric classes using machine learning techniques. The processor is configured to alter the region of interest to generate an altered image when the geometric class is associated with an identity of a person, such that privacy associated with the identity of the person is protected. The processor is configured to send the altered image to a user interface or store the altered image in a standardized format.

22 Claims, 8 Drawing Sheets

(51) Int. Cl.
   *G06K 9/32* (2006.01)
   *G06K 9/66* (2006.01)
(52) U.S. Cl.
   CPC ....... *G06K 9/00771* (2013.01); *G06K 9/3233* (2013.01); *G06K 9/66* (2013.01)
(58) Field of Classification Search
   CPC ........... G06K 21/6245; G06K 9/00288; G06K 9/3233; G06K 9/66
   See application file for complete search history.

(56) References Cited

U.S. PATENT DOCUMENTS

| | | | | |
|---|---|---|---|---|
| 5,629,752 | A * | 5/1997 | Kinjo | G03B 27/80 355/35 |
| 5,801,970 | A * | 9/1998 | Rowland | G01S 3/7865 342/63 |
| 7,239,746 | B1 * | 7/2007 | Sinclair | G06F 17/3025 382/173 |
| 8,345,921 | B1 * | 1/2013 | Frome | G06K 9/72 382/103 |
| 8,666,110 | B2 * | 3/2014 | Yoo | H04N 7/18 382/100 |
| 8,761,498 | B1 * | 6/2014 | Wu | G06K 9/00624 382/159 |
| 8,923,647 | B2 * | 12/2014 | Kothari | G06K 9/00677 382/118 |
| 8,958,630 | B1 * | 2/2015 | Gallup | G06K 9/6293 382/159 |
| 9,056,253 | B2 * | 6/2015 | Thompson | A63F 13/12 |
| 9,405,986 | B2 * | 8/2016 | Kim | G06K 9/228 |
| 9,443,192 | B1 * | 9/2016 | Cosic | G06N 3/02 |
| 9,547,908 | B1 * | 1/2017 | Kim | G06T 5/20 |
| 10,217,195 | B1 * | 2/2019 | Agrawal | G06T 5/003 |
| 2003/0108240 | A1 * | 6/2003 | Gutta | G06T 5/002 382/181 |
| 2004/0145659 | A1 * | 7/2004 | Someya | H04N 7/18 348/207.99 |
| 2005/0025357 | A1 * | 2/2005 | Landwehr | A01M 1/026 382/170 |
| 2005/0088542 | A1 * | 4/2005 | Stavely | H04N 5/23222 348/239 |
| 2005/0129272 | A1 * | 6/2005 | Rottman | G06K 9/00228 382/103 |
| 2005/0275723 | A1 * | 12/2005 | Sablak | G06T 7/194 348/169 |
| 2007/0201694 | A1 * | 8/2007 | Bolle | G06T 1/0021 380/205 |
| 2007/0230744 | A1 * | 10/2007 | Dronge | G08B 13/194 382/103 |
| 2007/0296817 | A1 * | 12/2007 | Ebrahimi | G08B 13/19667 348/161 |
| 2008/0118105 | A1 * | 5/2008 | Friedhoff | G06K 9/4661 382/103 |
| 2008/0180539 | A1 * | 7/2008 | Jung | G11B 27/034 348/222.1 |
| 2008/0267403 | A1 * | 10/2008 | Boult | H04L 9/0894 380/255 |
| 2009/0207269 | A1 * | 8/2009 | Yoda | G06T 11/60 348/222.1 |
| 2010/0008540 | A1 * | 1/2010 | Shet | G06K 9/00369 382/103 |
| 2011/0096922 | A1 * | 4/2011 | Oya | H04N 7/183 380/28 |
| 2011/0096991 | A1 * | 4/2011 | Lee | G06T 11/60 382/173 |
| 2011/0161076 | A1 * | 6/2011 | Davis | G06F 3/04842 704/231 |
| 2011/0184950 | A1 * | 7/2011 | Skaff | G06F 17/30265 707/737 |
| 2012/0045095 | A1 * | 2/2012 | Tate | G06T 5/003 382/103 |
| 2012/0158739 | A1 * | 6/2012 | Ah-Pine | G06F 17/30023 707/748 |
| 2013/0035979 | A1 | 2/2013 | Tenbrock | |
| 2013/0108105 | A1 * | 5/2013 | Yoo | H04N 5/272 382/103 |
| 2013/0272565 | A1 * | 10/2013 | Fagundes | H04M 3/523 382/100 |
| 2014/0029804 | A1 * | 1/2014 | Kawaguchi | G06T 11/60 382/105 |
| 2014/0072279 | A1 | 3/2014 | Maeda | |
| 2014/0085480 | A1 * | 3/2014 | Saptharishi | H04N 7/181 348/159 |
| 2014/0201126 | A1 * | 7/2014 | Zadeh | G06K 9/627 706/52 |
| 2014/0330132 | A1 * | 11/2014 | Raskin | A61B 5/02427 600/479 |
| 2015/0022660 | A1 * | 1/2015 | Kavadeles | G06K 9/00771 348/143 |
| 2015/0104103 | A1 * | 4/2015 | Candelore | G06K 9/00288 382/195 |
| 2015/0145992 | A1 * | 5/2015 | Traff | G06T 11/60 348/143 |
| 2015/0220777 | A1 * | 8/2015 | Kauffmann | G06K 9/00362 382/103 |
| 2015/0328082 | A1 * | 11/2015 | Jiang | A61H 19/00 600/38 |
| 2015/0363670 | A1 * | 12/2015 | Sugishita | H04N 7/181 382/155 |
| 2015/0379371 | A1 * | 12/2015 | Yoon | G06K 9/6289 382/103 |
| 2016/0246996 | A1 * | 8/2016 | Khoo | G06F 3/048 |
| 2016/0286156 | A1 * | 9/2016 | Kovac | H04N 5/772 |
| 2016/0307600 | A1 * | 10/2016 | Koide | G11B 27/036 |
| 2017/0069201 | A1 * | 3/2017 | Sedlik | G08G 1/0112 |
| 2017/0084065 | A1 * | 3/2017 | Gordon | G06F 16/5838 |
| 2017/0178287 | A1 * | 6/2017 | Anderson | G06K 9/00302 |
| 2018/0204111 | A1 * | 7/2018 | Zadeh | G06N 3/0436 |

FOREIGN PATENT DOCUMENTS

| | | |
|---|---|---|
| WO | WO 02/01504 A2 | 1/2002 |
| WO | WO 2006/070249 A1 | 7/2006 |
| WO | WO 2012/081969 A1 | 6/2012 |

OTHER PUBLICATIONS

Koide, Machine generated translation of JP-2016-208127 A, Dec. 2016.*
P. Viola et al: "Rapid object detection using a boosted cascade of simple features", Proceedings of the 2001 IEEE Computer Society Conference on Computer Vision and Pattern Recognition. CVPR 2001, vol. 1, Jan. 1, 2001 (Jan. 1, 2001), pp. 1-511, XP055141503, DOI: 10.1109/CVPR.2001.990517 ISBN: 978-0-76-951272-3.
Dufaux et al: "video surveillance using JPEG 2000", Optomechatronic Micro/Nano Devices and Components III : Oct. 8-10, 2007, Lausanne, Switzerland; [Proceedings of SPIE, ISSN 0277-786X], SPIE, Bellingham, Wash, vol. 5558, Jan. 1, 2004 (Jan. 1, 2004), pp. 268-275, XP0091087 40, DOI: 10.1117/12.564828 ISBN: 978-1-62841-730-2.
International Search Report for International Application No. PCT/EP2017/051869, dated May 3, 2017.
International Search Report and Written Opinion for International Application No. PCT/EP2017/051869, dated Jun. 27, 2017.

* cited by examiner

300

302 — Receive a set of images associated with a video recorded by a moving or a non-moving camera.

304 — Detect a structure of a region of interest from a set of regions of interest in an image from the set of images.

306 — Classify the structure into a geometric class from a set of predefined geometric classes using machine learning techniques.

308 — Is the geometric class associated with an identity of a person?

310 — No → Maintain the region of interest unchanged and go to the geometric class of the next region of interest.

Yes ↓

312 — Alter the region of interest to generate an altered image.

314 — At least one of send the altered image to a user interface or store the altered image in a standardized format

402 — Receive a set of images associated with a video recorded by a non-moving camera.

404 — Select a set of feature points in an image from the set of images.

406 — Define a first moving direction of each feature point from the first set of feature points within the set of images.

408 — Define a second moving direction of each feature point from the second set of feature points within the set of images.

410 — The first set of feature points > the second set of feature points?

No → back to 408

Yes ↓

412 — Alter the region of interest associated with each feature point from the second set of feature points to produce an altered image.

414 — At least one of send the altered image to a user interface or store the altered image in a standardized format

502 — Receive a set of images associated with video data recorded by a moving camera.

504 — Detect, based on a characteristic associated with a person, a first region of interest from the set of regions of interest and associated with an identity of the person.

506 — Track the first region of interest within the set of images.

508 — Determine a first moving direction associated with a first set of feature points within a second region of interest from the set of regions of interest.

510 — Detect a fourth region of interest within the set of images and associated with the person, based on classifying the person into a geometric class different from a geometric class of a background structure within the set of images.

512 — Alter at least one of the first region of interest, the second region of interest, or the fourth region of interest to produce an altered set of images.

514 — At least one of send the altered set of images to the user interface or store the altered set of images in a standardized format.

FIG. 5

METHODS AND APPARATUS FOR USING VIDEO ANALYTICS TO DETECT REGIONS FOR PRIVACY PROTECTION WITHIN IMAGES FROM MOVING CAMERAS

CROSS-REFERENCE TO RELATED APPLICATION

This application claims priority to and the benefit of U.S. Provisional Patent Application Ser. No. 62/288,762, filed on Jan. 29, 2016, and titled "Privacy-Protective Data Management System for Moving Cameras," the contents of which are incorporated herein by reference in its entirety.

BACKGROUND

Some embodiments described herein relate generally to method and apparatus for video analytics and management regarding moving cameras. In particular, but not by way of limitation, some embodiments described herein relate to methods and apparatus for protecting privacy in videos recorded with moving cameras such as body-worn cameras, vehicle cameras, or cameras of unmanned aerial vehicles (a.k.a. drones), and/or the like.

Moving cameras are often used in public spaces and produce massive amounts of data every day. The videos recorded by the moving cameras are often stored locally, uploaded to a server, or streamed live. It is beneficial to protect the privacy of individuals appearing in the videos when these videos are released publically and/or when explicit consent to the video recording is not provided by the individuals. Privacy protection might also be desirable in cases of nonpublic disclosure of the videos. For example, when a video is used as forensic evidence, it would be beneficial to protect the privacy of persons not involved in an incident captured by the video.

Some known systems require manually marking privacy-related information. This can be time consuming, expensive, and hence infeasible for a large amount of data. It is also challenging to automatically select privacy-related information in videos generated by moving cameras. In addition, some known moving cameras can generate additional data along with the series of image frames associated with the video. Such data can include, for example, audio or certain types of metadata such as Global Positioning System ("GPS") coordinates, time stamps, and/or user information. Such data may implicitly violate the privacy of an individual and therefore should also be considered in a privacy protective system. Accordingly, a need exists for methods and apparatus to automatically or semi-automatically protect privacy in data recorded by moving cameras.

SUMMARY

In some embodiments, an apparatus includes a memory and a processor operatively coupled to the memory. The processor is configured to receive a set of images associated with a video recorded by a moving or a non-moving camera. The processor is configured to detect a structure of a region of interest from a set of regions of interest in an image from the set of images. The processor is configured to classify the structure into a geometric class from a set of predefined geometric classes using machine learning techniques. The processor is configured to alter the region of interest to generate an altered image when the geometric class is associated with an identity of a person, such that privacy associated with the identity of the person is protected. The processor is configured to send the altered image to a user interface or store the altered image in a standardized format.

BRIEF DESCRIPTION OF THE DRAWINGS

FIG. 3 is a flow chart illustrating a geometry-based privacy-protective data management method, according to an embodiment.

FIG. 4 is s flow chart illustrating an optical flow-based privacy-protective data management method, according to an embodiment.

FIG. 5 is a flow chart illustrating a combined privacy-protective data management method, according to an embodiment.

DETAILED DESCRIPTION

Figure 1A:
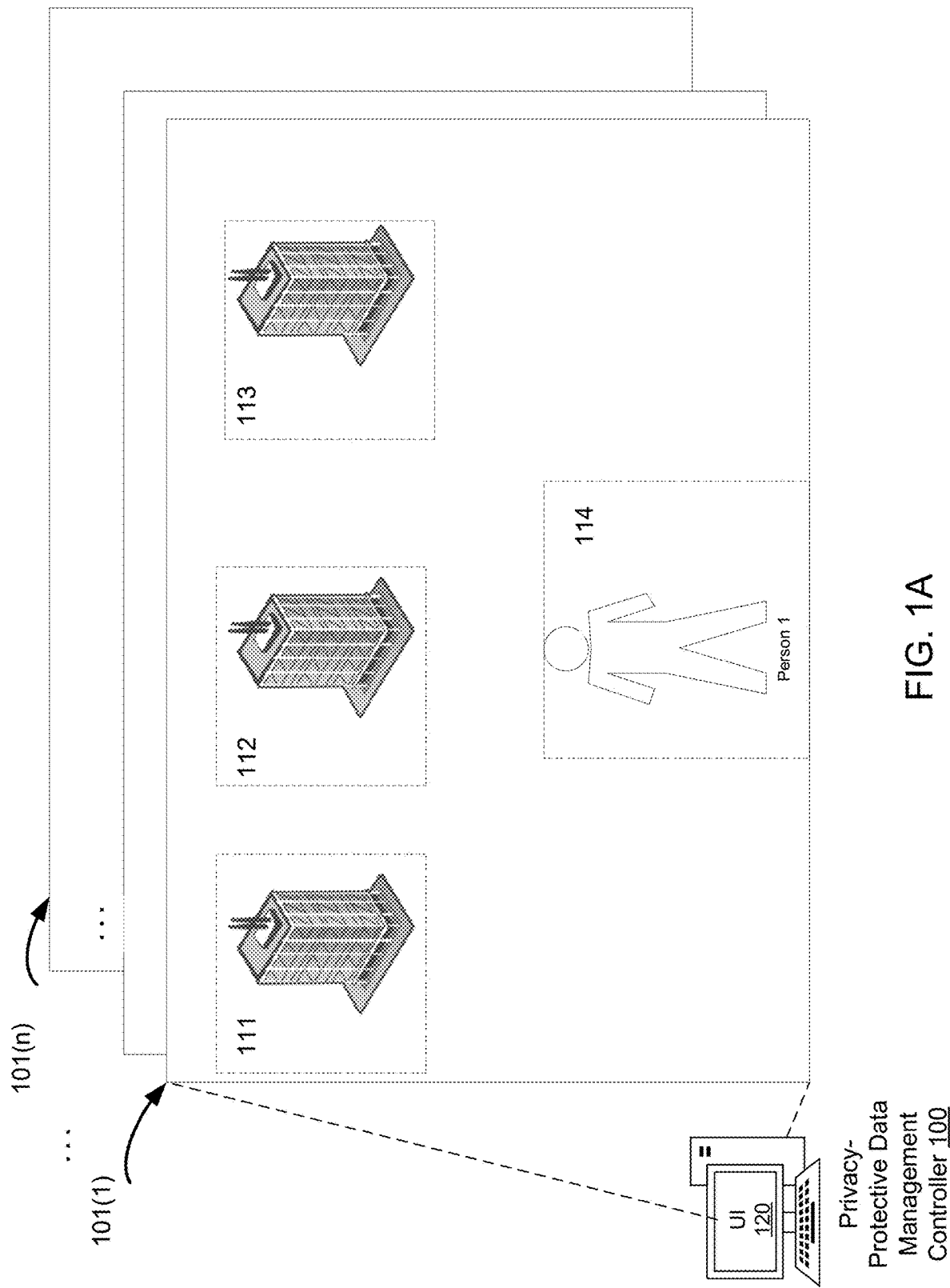
FIG. 1A is a block diagram illustrating a geometry-based privacy-protective data management system, according to an embodiment.

In some embodiments, an apparatus includes a memory and a processor operatively coupled to the memory. The processor is configured to receive a set of images associated with a video recorded by a moving or a non-moving camera. The processor is configured to detect a structure of a region of interest from a set of regions of interest in an image from the set of images. The processor is configured to classify the structure into a geometric class from a set of predefined geometric classes using machine learning techniques. The processor is configured to alter the region of interest to generate an altered image when the geometric class is associated with an identity of a person, such that privacy associated with the identity of the person is protected. The processor is configured to send the altered image to a user interface or store the altered image in a standardized format.

In some embodiments, a method includes receiving a set of images associated with a video recorded by a moving camera, and selecting a set of feature points in an image from the set of images. Each feature point from the set of feature points is associated with a different region of interest from a set of regions of interest in the image, and the set of feature points includes a first set of feature points and a second set of feature points. The method includes defining a first movement direction of each feature point from the first set of feature points within the set of images, and defining a second movement direction of each feature point from the second set of feature points within the set of images. When the first set of feature points includes a greater number of feature points than the second set of feature points, the method includes altering the region of interest associated with each feature point from the second set of feature points to produce an altered image to protect privacy-related information included in the region of interest associated with each feature point from the second set of feature points, and at least one of sending the altered image to a user interface or storing the altered image in a standardized format.

A non-transitory processor-readable medium storing code representing instructions to be executed by a processor. The code includes code to cause the processor to receive a set of images associated with video data recorded by a moving camera. Each image from the set of images includes a set of regions of interest. The code includes code to cause the processor to detect, based on a characteristic associated with a person, a first region of interest from the set of regions of interest and associated with an identity of the person, and track the first region of interest within the set of images. The code includes code to cause the processor to determine a first movement direction associated with a first set of feature points within a second region of interest from the set of regions of interest. The first movement direction is different from a second movement direction associated with a second set of feature points within a third region of interest from the set of regions of interest. The second region of interest includes a fewer number of feature points than the third region of interest. The code includes code to cause the processor to detect a fourth region of interest within the set of images and associated with the person, based on classifying a portion of the image within the fourth region of interest into a geometric class different from a geometric class of a background structure within the set of images. The code includes code to cause the processor to alter at least one of the first region of interest, the second region of interest, or the fourth region of interest to produce an altered set of images based on a confidence score of privacy protection meeting a predefined criterion for the at least one of the first region of interest, the second region of interest, or the fourth region of interest. The code includes code to cause the processor to at least one of send the altered set of images to the user interface or store the altered set of images in a standardized format.

As used herein, the term "privacy protection" refers to any method that is able to prevent the unauthorized identification of an individual.

As used herein, the term "moving camera" refers to any non-stationary device that is capable of capturing visual data such as images or videos (e.g., a body-worn camera, a vehicle camera, a pan-tilt-zoom (PTZ) camera, an unmanned aerial vehicle camera, etc.). The term "moving camera" also refers to any stationary device that is capable of capturing visual data and that includes moving components. For example, a PTZ camera can adjust its lens to pan, tilt, or zoom while stationary. In some embodiments, a moving camera can capture and/or sense additional data including, for example, audio data, metadata associated with the video (e.g., GPS, time stamps), and/or the like. In some instances, the moving direction of the moving camera is not provided to the geometry-based privacy-protective data management system, the optical flow-based privacy-protective data management system, and/or the combined privacy-protective data management system. In other instances, the moving direction of the moving camera can provided to the geometry-based privacy-protective data management system (e.g., via metadata provided by the moving camera).

As used herein, the term "non-moving" camera refers to static and/or stationary cameras, which can be relocated.

As used herein, the term "body-worn camera" refers to any moving camera worn by a person.

As used herein, the term "vehicle camera" refers to any moving camera installed in a vehicle either as part of a driver assistant system or as an event data recorder (a.k.a. dashcam or black box).

As used herein the term "privacy-related information" refers to any data that are associated with an identity of an individual or an object. In some instances, such privacy-related information can be protected to avoid revealing the identity of the individual or the object.

As used herein, a module can be, for example, any assembly and/or set of operatively-coupled electrical components associated with performing a specific function, and can include, for example, a memory, a processor, electrical traces, optical connectors, software (executing in hardware) and/or the like.

FIG. 1A is a block diagram illustrating a geometry-based privacy-protective data management system, according to an embodiment. In some embodiments, a moving or a non-moving camera (not shown) records a video that includes a set of images (or video frames) 101(1)-101((n)), as well as, in some implementations, audio data and metadata (not shown) associated with the set of images 101(1)-101((n)). The privacy-protective data management controller 100 (or a processor within the privacy-protective data management controller 100) can be configured to receive the video from the moving or the non-moving camera. Based on a geometry of each region of interest ("ROI") from a set of regions of interest 111-114 in an image 101(1) from the set of images, the privacy-protective data management controller 100 can be configured to protect privacy-related information associated with the image 101(1) that may reveal an identity of a person (e.g., 114) or an object.

Specifically, the privacy-protective data management controller 100 can detect a structure (or edges, textures) of a region of interest from the set of regions of interest 111-114 in the image 101(1). Background structures 111-113 such as buildings, cars, roads, and/or the like differ in their geometry to the structure of humans and animals 115. For example, background structures 111-113 such as buildings, cars, roads, and/or the like often have substantially straight lines, while the structure of humans and animals often does not have substantially straight lines. The privacy-protective data management controller 100 can classify the structure of each region of interest 111-114 into a geometric class from a set of predefined geometric classes. For example, when the privacy-protective data management controller 100 detects a region of interest (ROI) including a set of substantially straight lines (such as ROI 111), the privacy-protective data management controller 100 can classify ROI 111 as a background. When the privacy-protective data management controller 100 detects a ROI including a set of substantially non-structured lines (such as ROI 114), the privacy-protective data management controller 100 can classify ROI 114 as a foreground (or a target, or a human).

When the geometric class of an ROI is associated with an identity of a person, the privacy-protective data management controller 100 can then alter (or blur, scramble, pixelate, blank) the ROI (or only a portion of the ROI, such as the face of the person) to remove any privacy-related information in the ROI and generate an altered image, such that privacy associated with the identity of the person is protected. The privacy-protective data management controller 100 can send the altered image to a user interface 120 or store the altered image in a standardized format (e.g., in a memory of the privacy-protective data management controller 100, in a memory of a server accessible by the privacy-protective data management controller 100, and/or within any other suitable memory). For example, the privacy-protective data management controller 100 can convert the image (or video associated with the image) into a standardized format such as, for example, Audio Video Interleave ("AVI"), Advanced Systems Format ("ASF"), MOV, MPEG-1, MPEG-2, and/or the like. The privacy-protective data management controller 100 can then store the image (or video associated with the image) in the standardized format.

In some implementations, when the set of images 101(1)-101((n)) is recorded by the moving or the non-moving camera in a known environment (e.g., city, desert, a ski resort, etc.), the privacy-protective data management controller 100 can retrieve, from a memory operatively coupled with the privacy-protective data management controller 100, a set of pre-defined geometric classes associated with the known environment to facilitate with classifying the structure into a geometric class.

In some implementations, the set of predefined geometric classes (e.g., humans, animals, buildings, and/or the like) can be defined using machine learning techniques. The privacy-protective data management controller 100 can receive manual selections and/or annotations of geometric features from a set of sample images and classify the geometric features into at least one geometric class from the set of predefined geometric classes. The privacy-protective data management controller 100 can define a machine learning model and train the machine learning model using a set of parameters (e.g., known annotated data and/or weights associated with a function specified by the machine learning model) and machine learning techniques. Based on the machine learning model and the set of parameters, the privacy-protective data management controller 100 can automatically classify the structure in a ROI into a geometric class. In some instances, the machine learning techniques can include, for example, neural networks, deep neural networks, decision trees, random forests, and/or any other suitable machine learning technique.

In some implementations, the privacy-protective data management controller 100 can define a grid (not shown) overlaid on and/or placed over each image from the set of images 101(1)-101((n)). The grid includes a set of grid cells (e.g., ROIs 131-134 are examples of grid cells) and each grid cell from the set of grid cells can define and/or is associated with a different ROI from the set of ROIs in the image. The grid can be in a regular shape or an irregular shape. The grid can be orthogonal or perspective. The size of each grid cell can be substantially the same or different, or arbitrarily chosen to suit a given environment. The privacy-protective data management controller 100 can detect a structure of each ROI in each grid cell from the set of grid cells. The privacy-protective data management controller 100 can classify each grid cell into the set of predefined geometric classes using a set of parameters stored in the memory.

Figure 1B:
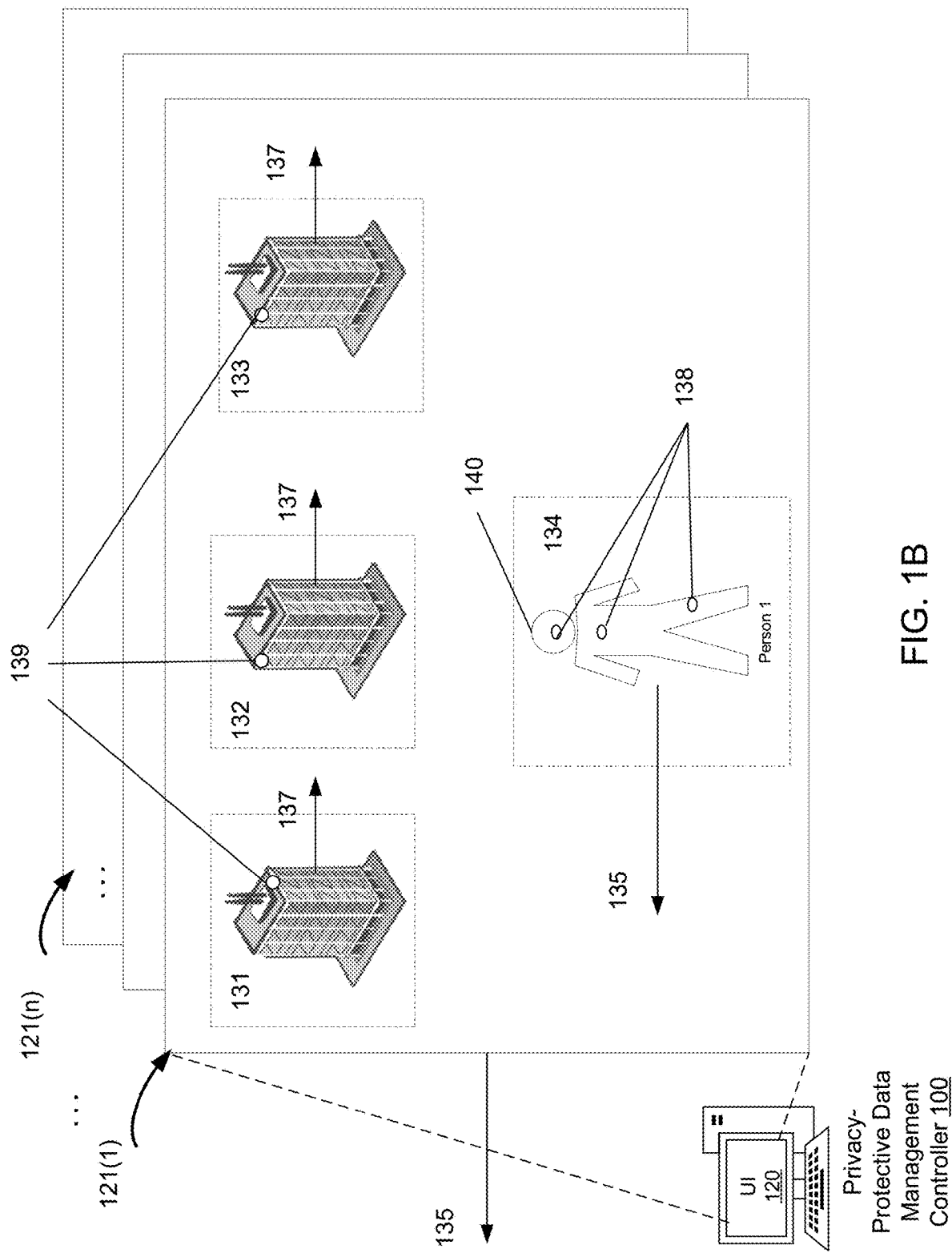
FIG. 1B is a block diagram illustrating an optical flow-based privacy-protective data management system, according to an embodiment.

FIG. 1B is a block diagram illustrating an optical flow-based privacy-protective data management system, according to an embodiment. In some embodiments, a camera (not shown), moving in a direction 135, records a video that includes a set of images 121(1)-121(n). In some implementations, the moving camera also records audio data and/or metadata (not shown). The privacy-protective data management controller 100 (or a processor within the privacy-protective data management controller 100) can be configured to receive the video from the moving camera. As the camera moves in direction 135, a first set of feature points 139 may appear to move in the recorded video in direction 137, and a second set of feature points 138 may appear to move in the recorded video in direction 135 different from direction 137. Based on the motion of the first set of feature points 139 relative to the motion of the second set of feature points 138, the privacy-protective data management controller 100 can be configured to protect privacy-related information associated with the image 121(1) that may reveal an identity of a person (e.g., 140) or another object of interest (e.g., a vehicle).

For example, in a situation when a camera is worn on a policeman (not shown) who is chasing a suspect 140, the camera, moving in a direction 135 based on the policeman's movement, records a video that includes a set of images 121(1)-121((n)). The privacy-protective data management controller 100 can be configured to receive the set of images 121(1)-121((n)) from the moving camera. The privacy-protective data management controller 100 (or a processor therein) can select a set of feature points 138-139 in an image 121(1) from the set of images 121(1)-121((n)). In some implementations, the privacy-protective data management controller 100 can select the set of feature points based on a texture (e.g., pattern, appearance, design, and/or the like) associated with each region of interest from the set of regions of interest in the image 121(1). In some implementations, the privacy-protective data management controller 100 can select the set of feature points randomly within each ROI from the set of ROIs in the image. In some implementations, the privacy-protective data management controller 100 can select the center of each ROI from the set of ROIs in the image as the set of feature points. In some implementations, the privacy-protective data management controller 100 can apply the edge, corner, blob, or ridge detectors to select the set of feature points.

The privacy-protective data management controller 100 can then define a moving direction of each feature point from the set of feature points 138-139. In some situations, a first subset of feature points 139 from the set of feature points 138-139 moves in a first direction, and a second subset of feature points 138 from the set of feature points 138-139 moves in a second direction different from the first direction. In this example, because the camera moves in the second direction 135, the buildings 131-133 in the video appear to move in the first direction 137 opposite to the second direction 135. The second set of feature points 138 appears to move in the same direction 135 as the camera because the policeman (not shown) is moving in the same direction as the person 140. In another example, the second set of feature points 138 may appear to move in a different direction (but not at the same speed) as the camera or may appear still in the set of images 121(1)-121((n)) if the camera and the person 140 are moving at substantially the same speed or if the camera is following the person 140.

In some implementations, the privacy-protective data management controller 100 can determine a number of feature points from the first subset of feature points 139 that appear to move in the first direction 137 and a number of feature points from the second subset of feature points 138 that appear to move in the second direction 135. A set of feature points that is associated with the background of an image (i.e., moves in an opposite direction from the camera) often has a greater number of feature points than a set of feature points that is associated with the foreground of the image (i.e., moves in the same direction as the camera or in a different direction as the first subset of feature points 139). In other words, when the number of feature points of the first subset of feature points is greater than the number of feature points of the second subset of feature points, the privacy-protective data management controller 100 can determine and/or infer that the first set of feature points is associated with the background and the second set of feature points is associated with the person 134 (or other foreground object of interest). The privacy-protective data management controller 100 can alter the ROIs associated with each feature point from the second subset of feature points 138 to produce an altered image to protect privacy-related information included in the region of interest associated with each feature point from the second subset of feature points 138. The privacy-protective data management controller 100 can send the altered image to a user interface 120 or store the altered image in a standardized format.

In some implementations, the ROIs can be defined based on a grid (as described above). Specifically, in such implementations, the privacy-protective data management controller 100 can define a grid (not shown) overlaid and/or placed over each image from the set of images 121(1)-121((n)). The grid includes a set of grid cells (e.g., ROIs 131-134 are examples of grid cells). A feature point can then be defined and/or identified for each ROI by the privacy-protective data management controller 100 (or a processor therein). For example, in some instances, the feature point can be a center point in each ROI. In other instances, the feature point can be randomly selected in each ROI. In still other instances, the feature point can be selected for each ROI in any other suitable manner. The grid can be in a regular shape or an irregular shape. The grid can be orthogonal or perspective. The size of each grid cell can be substantially the same or different, or arbitrarily chosen to suit a given environment. The privacy-protective data management controller 100 can define a trajectory associated with each feature point defined in each grid cell from the set of grid cells and determine a set of characteristics associated with the trajectory of each feature point. The set of characteristics can include a length of a trajectory, a moving direction of the trajectory, and/or the like. When the set of characteristics associated with a second set of feature points (e.g., 138) is less coherent and/or uniform than the set of characteristics associated with a first set of feature points (e.g., 139), the ROIs associated with the first set of feature points (e.g., 139) are likely and/or can be inferred to be associated with a substantially stationary background (since such movement is solely based on the movement of the camera) and the ROIs associated with the second set of feature points (e.g., 138) are more likely to be associated with a foreground object (e.g., such as a person or vehicle).

For example, in some situations, the closer an object (or a person) is to the camera, the longer the trajectory. In other words, when the length of the trajectory of the second set of feature points (e.g., 138) is greater than the length of the trajectory of the first set of feature points (e.g., 139), the privacy-protective data management controller 100 can determine and/or infer that the second set of feature points (e.g., 138) is closer to the camera than the first set of feature points (e.g., 139). Thus, the second set of feature points (e.g., 138) is more likely to be associated with a foreground object (e.g., a person or vehicle). The privacy-protective data management controller 100 can alter the ROIs associated with the second set of feature points (e.g., 138) to produce the altered image to protect privacy-related information included in the ROIs associated with the second set of feature points (e.g., 138).

Figure 1C:
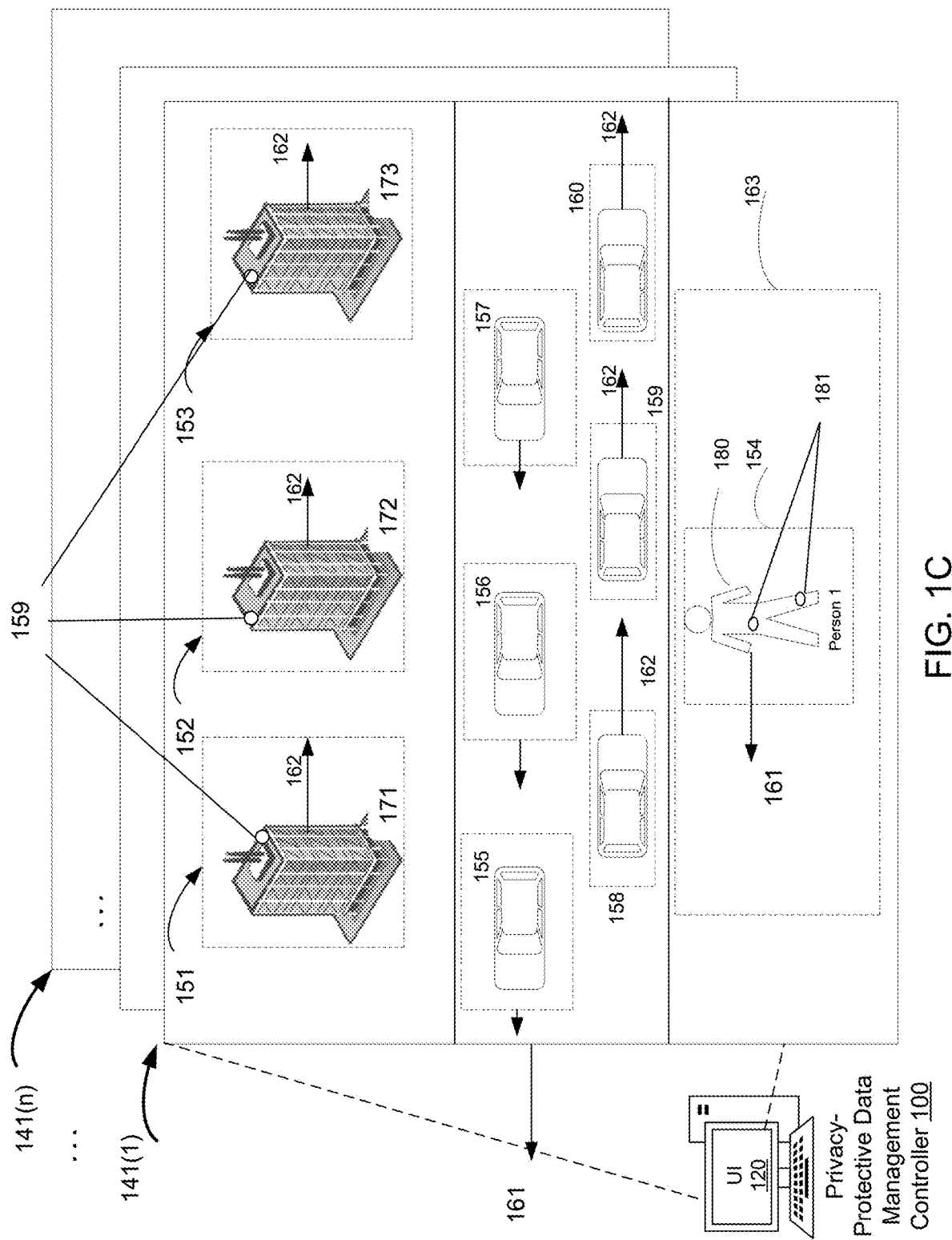
FIG. 1C is a block diagram illustrating a combined privacy-protective data management system, according to an embodiment.

FIG. 1C is a block diagram illustrating a combined privacy-protective data management system, according to an embodiment. In some embodiments, the privacy-protective data management controller 100 can combine at least two of the optical flow-based embodiment illustrated with regards to FIG. 1B, the geometry-based embodiment illustrated with regards to FIG. 1A, and an object detector embodiment (described in further detail herein), to improve the reliability of the privacy protection in different use cases.

For example, a video (or a set of images 141(1)-141((n))), recorded by a moving camera (not shown), can include non-moving and structured buildings 171-173, a set of structured cars 155-160 moving in different directions, and a person of interest 180 moving in a direction 161. The moving camera can be, for example, on a moving drone configured to record activities of the person of interest 180. The privacy-protective data management controller 100 (or processor therein) can first determine that a first set of feature points of a first set of ROIs 151-153 appear to be moving in a direction 162 opposite to the direction 161 of the camera, while a second set of feature points of a second set of ROIs 154 appear to be moving in same direction 161 of the camera. In addition, the first set of feature points 159 include a greater number of feature points than the second set of feature points 181, indicating that the second set of feature points 181 is more likely to be associated with an object of interest (e.g., a person or vehicle). The privacy-protective data management controller 100 can calculate a confidence score of privacy protection and determine if the confidence score meets a predefined criterion. If the confidence score meets the predefined criterion, the privacy-protective data management controller 100 can alter ROIs associated with the second set of feature points 154 to produce an altered set of images such that the privacy related information associated with the second feature points 154 is protected. In some implementations, the confidence score of privacy protection can be a numerical value indicating a likelihood of all or a portion of privacy-related information in the video is protected. For example, a confidence score of 80% indicates that the likelihood of having no privacy-related information remaining in the video is 80%. The confidence score can be calculated based on a set of sample images and manually defined confidence score of each sample image of the set of sample images.

In some implementations, if the confidence score does not meet the predefined criterion, the privacy-protective data management controller 100 can use the geometry-based embodiment illustrated with regards to FIG. 1A, and/or an object detector embodiment to improve the reliability of the privacy protection. In other implementations, the privacy-protective data management controller 100 can determine to use the geometry-based embodiment illustrated with regards to FIG. 1A, and/or an object detector embodiment to improve the reliability of the privacy protection, regardless of the confidence score of the optical flow-based embodiment illustrated above. For example, the privacy-protective data management controller 100 can detect that the structure associated with ROIs 155-160 includes a set of substantially straight lines, and the structure associated with ROI 154 does not include a set of substantially straight lines. Based on the structure, the privacy-protective data management controller 100 can classify ROIs 155-160 as background (or not an object of interest) and ROI 154 as a foreground (or an object of interest). The privacy-protective data management controller 100 can classify the ROIs 155-160 as background even though the feature points of ROIs 155-160 may indicate that they are not background. Thus, by using both the optical flow and geometry-based methods, the privacy-protective data management controller 100 can better and more definitively identify specific objects of interest (e.g., distinguish moving people from moving vehicles and stationary buildings). The privacy-protective data management controller 100 can again calculate the confidence score of privacy protection and determine if the confidence score meets a predefined criterion. If the confidence score meets the predefined criterion, the privacy-protective data management controller 100 can alter ROI 154 to produce an altered set of images such that the privacy related information associated with ROI 154 is protected.

In some implementations, if the confidence score does not meet the predefined criterion, the privacy-protective data management controller 100 can use an object detector method and/or process to improve the reliability of the privacy protection. In other implementations, the privacy-protective data management controller 100 can determine to use the object detector method and/or process regardless of the confidence score determined. The privacy-protective data management controller 100 can detect a person, a face, or an object using machine learning techniques. For example, the privacy-protective data management controller 100 can define a machine learning model and train the machine learning model using a set of parameters and/or data that include manually marked and/or annotated ROIs in a set of sample images of, for example, a person, a face, and/or an object. Such parameters can be used to optimize the machine learning model. Based on the machine learning model and the set of parameters, the privacy-protective data management controller 100 can automatically detect certain features in an image as a person, a face, or an object. Once detected, the privacy-protective data management controller 100 can track such features in the set of images of the video and alter these feature to produce an altered set of images. The privacy-protective data management controller 100 can again calculate the confidence score of privacy protection and determine if the confidence score meets a predefined criterion. If the confidence score privacy protection meets the predefined criteria, the privacy-protective data management controller 100 can alter the ROIs associated with an object of interest (e.g., a person or vehicle) to produce an altered image(s). The privacy-protective data management controller 100 can send the altered set of images to the user interface 120 or store the altered set of images in a standardized format.

In some implementations, the privacy-protective data management controller 100 can detect if a ROI is associated with an object of interest based at least in part on a physical motion limit of the object of interest. For example, if a feature in the ROI moves quickly to a height of 80 feet (i.e., as movement is monitored between the set of images), the privacy-protective data management controller 100 can determine that the feature is in not associated with a person or car because a person or car is not able to jump to a height of 80 feet.

In some implementations, the privacy-protective data management controller 100 can determine if a smaller area of ROI within a previously-detected and larger area of ROI is associated an identity of a person. For example, the privacy-protective data management controller 100 can determine that ROI 163 is associated with an identity of a person. The privacy-protective data management controller 100 can further detect that only a smaller area of ROI 154 within the ROI 163 is associated with the identity of the person. Thus, the privacy-protective data management controller 100 can alter the smaller area of ROI 154 to protect the privacy without altering other area of ROI 163 where privacy information is not disclosed.

Figure 2:
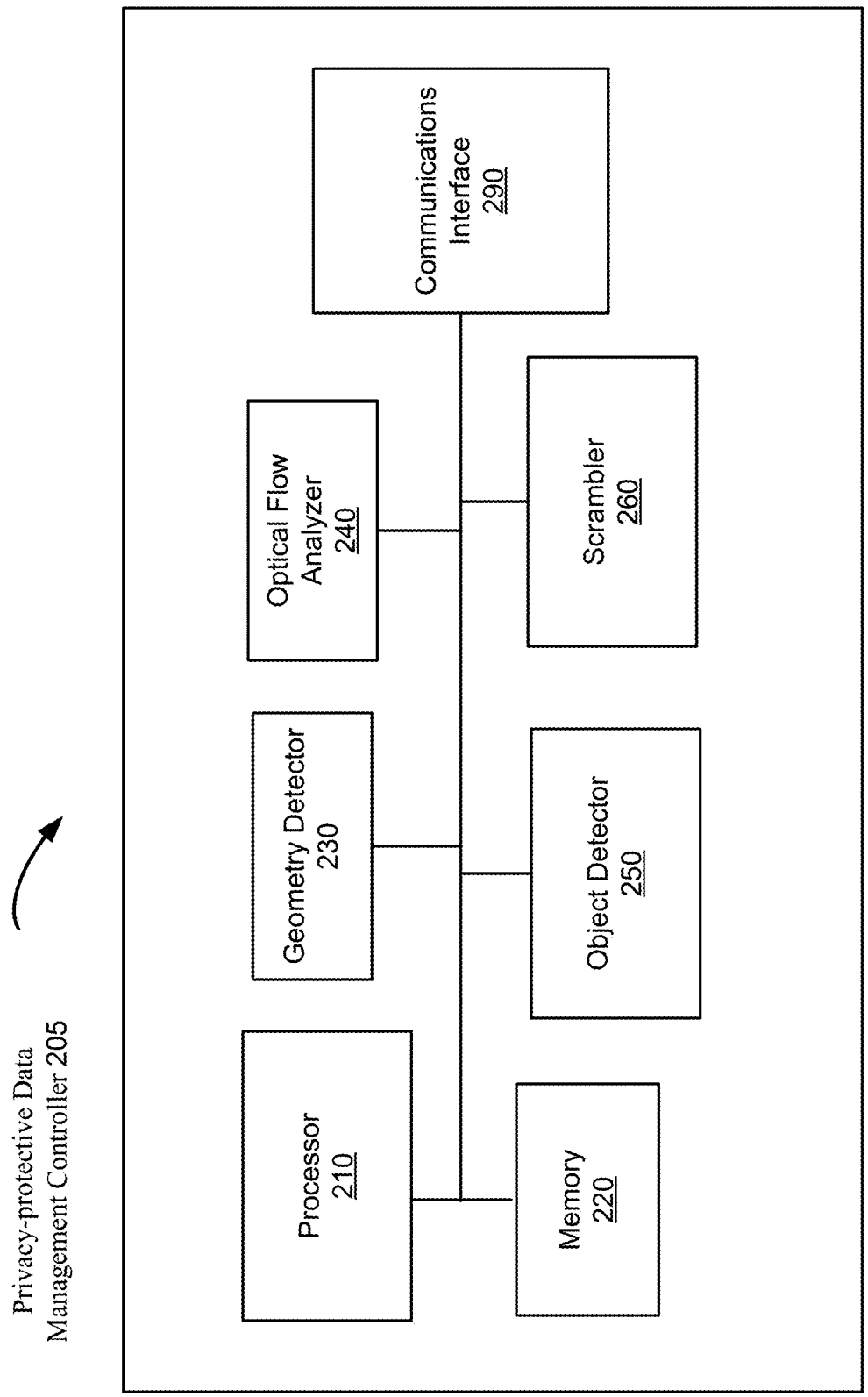
FIG. 2 is a block diagram illustrating a privacy-protective data management controller, according to an embodiment.

FIG. 2 is a block diagram illustrating a privacy-protective data management controller 205, according to an embodiment. The privacy-protective data management controller 205 can be structurally and/or functionally similar to privacy-protective data management controller 100 in FIGS. 1A-1C. In some embodiments, controller 205 is a hardware device (e.g., compute device, server, smart phone, tablet, etc.). Controller 205 can include a processor 210, a memory 220, a communications interface 290, a geometry detector 230, an optical flow analyzer 240, an object detector 250, and a scrambler 260.

Each module or component in controller 205 can be operatively coupled to each remaining module or component. Each of the geometry detector 230, the optical flow analyzer 240, the object detector 250, and the scrambler 260 in controller 205 can be any combination of hardware and/or software (stored and/or executing in hardware such as processor 210) capable of performing one or more specific functions associated with that module. In some implementations, a module or a component in controller 205 can include, for example, a field-programmable gate array (FPGA), an application specific integrated circuit (ASIC), a digital signal processor (DSP), software (stored and/or executing in hardware such as processor 210) and/or the like.

The processor 210 can be any suitable hardware processing device such as, for example, a general purpose processor, a field-programmable gate array (FPGA), an application specific integrated circuit (ASIC), a combination thereof, and/or the like. In some instances, the processor 210 can include and/or execute software-based modules (e.g., a module of computer code executed at processor 210, a set of processor-readable instructions executed at processor 210), and/or a combination of hardware- and software-based modules. The processor 210 can be or can include any processing device or component configured to perform the data collecting, processing and transmitting functions as described herein. The processor 210 can be configured to, for example, write data into and read data from the memory 220, and execute the instructions stored within the memory 220. Processor 210 can also be configured to execute and/or control, for example, the operations of the communications interface 290, the geometry detector 230, the optical flow analyzer 240, the object detector 250, and the scrambler 260. In some implementations, based on the methods or processes stored within the memory 220, the processor 210 can be configured to execute the geometry-based privacy-protective data management method, the optical flow-based privacy-protective data management method, and/or the combined privacy-protective data management method, as described in FIGS. 3-5 respectively.

The memory 220 can be, for example, a random-access memory (RAM) (e.g., a dynamic RAM, a static RAM), a flash memory, a removable memory, a read only memory (ROM), and/or so forth. In some embodiments, the memory 220 can include, for example, a database, process, application, virtual machine, and/or some other software modules (stored and/or executing in hardware) or hardware modules configured to execute the geometry-based privacy-protective data management method, the optical flow-based privacy-protective data management method, and the combined privacy-protective data management method. In such implementations, instructions for executing the geometry-based privacy-protective data management method, the optical flow-based privacy-protective data management method, and the combined privacy-protective data management method and/or the associated methods can be stored within the memory 220 and executed at the processor 210.

The communications interface 290 can include and/or be configured to manage one or multiple ports (not shown in FIG. 2) of the privacy-protective data management controller 205. In some instances, for example, the communications interface 290 (e.g., a Network Interface Card (NIC) and/or the like) can be operatively coupled to devices (e.g., user input devices not shown in FIG. 2) and can actively communicate with a coupled device or over a network (e.g., communicate with end-user devices, host devices, servers, etc.). The communication can be over a network such as, for example, a Wi-Fi or wireless local area network ("WLAN") connection, a wireless wide area network ("WWAN") connection, a cellular connection and/or the like. A network connection can be a wired connection such as, for example, an Ethernet connection, a digital subscription line ("DSL") connection, a broadband coaxial connection, a fiber-optic connection and/or the like. In some embodiments, the communications interface 290 can be configured to, among other functions, receive data and/or information, and send commands, and/or instructions.

The geometry detector 230 can be configured to protect, based on a geometry of each region of interest ("ROI") from a set of regions of interest in an image from a set of images, privacy-related information associated with an object of interest in the image (e.g., that may reveal an identity of a person or an object). In some implementations, a moving or a non-moving camera (not shown) record a video that includes a set of images, as well as, in some implementations, audio data and/or metadata (not shown) associated with the set of images. The geometry detector 230 can be configured to receive the video from the moving or the non-moving camera via the communications interface 290. The geometry detector 230 can detect a structure (or edges, textures) of a region of interest from the set of regions of interest in the image (e.g., as described with respect to FIG. 1A). Background structures such as buildings, cars, roads, and/or the like differ in their geometry to the structure of humans and animals. For example, background structures such as buildings, cars, roads, and/or the like often have substantially straight lines, while the structure of humans and animals often does not have substantially straight lines. The geometry detector 230 can classify the structure of each region of interest into a geometric class from a set of predefined geometric classes. For example, when the geometry detector 230 detects a ROI comprising a set of substantially straight lines (such as ROI 111 of FIG. 1A), the geometry detector 230 can classify ROI as a background. When the geometry detector 230 detects a ROI comprising a set of substantially non-structured lines (such as ROI 114 of FIG. 1A), the geometry detector 230 can classify ROI 114 as a foreground (or a target, or a human).

When the geometric class of an ROI is associated with an object of interest (e.g., an identity of a person), the geometry detector 230 can then alter (or blur, scramble, pixelate, blank) the ROI (or only the face of the person) to remove any privacy-related information in the ROI and generate an altered image, such that privacy associated with the identity of the person is protected. The geometry detector 230 can send the altered image to a user interface or store the altered image in a standardized format.

In some implementations, when the set of images are recorded by the moving or the non-moving camera in a known environment (e.g., a city, desert, ski resort or other known environment), the geometry detector 230 can retrieve, from a memory operatively coupled with the geometry detector 230, a set of pre-defined geometric classes associated with the known environment to facilitate with classifying the structure into a geometric class. For example, the set of pre-defined geometric classes can be defined based on a set of sample images recorded by a non-moving camera or a moving camera in a known or an unknown environment. The environment in which the set of images are recorded can be the same as or different from the environment in which the set of sample images are recorded.

In some implementations, the set of predefined geometric classes (e.g., humans, animals, buildings, and/or the like) can be defined using machine learning techniques. The geometry detector 230 can receive manual selections of geometric features from a set of sample images and classify the geometric features into at least one geometric class from the set of predefined geometric classes. In some implementations, the set of sample images (or parameters to train the machine learning model) can be recorded by a non-moving camera in a known or an unknown environment. In some implementations, the set of sample images can be recorded by a moving camera in a known or an unknown environment. The geometry detector 230 can define a machine learning model and train the machine learning model using a set of parameters (as defined by the set of sample images) and machine learning techniques (as described above) with the set of sample images. Based on the machine learning model and the set of parameters, the geometry detector 230 can automatically classify the structure in a ROI into a geometric class.

In some implementations, the geometry detector 230 can define a grid (not shown) placed over and/or overlaid on each image from the set of images The grid includes a set of grid cells (not shown) and each grid cell from the set of grid cells is associated with a different ROI from the set of ROIs in the image. The grid can be in a regular shape or an irregular shape. The grid can be orthogonal or perspective. The size of each grid cell can be substantially the same or different, or arbitrarily chosen to suit a given environment. The geometry detector 230 can detect a structure of each ROI in each grid cell from the set of grid cells. The geometry detector 230 can classify each grid cell into the set of predefined geometric classes using a set of parameters stored in the memory.

In some embodiments, a camera (not shown), moving in a direction, records a video that includes a set of images. In some implementations, the moving camera also records audio data and/or metadata (not shown). The optical flow analyzer 240 can be configured to receive the video from the moving camera. As the camera moves in a first direction, a first set of feature points may move in the first direction and a second set of feature points may move in a second direction different from the first direction (or in multiple different directions different from the first direction). Based on the motion of the first set of feature points relative to the motion of the second set of feature points, the optical flow analyzer 240 can be configured to protect privacy-related information associated with an object of interest (e.g., that may reveal an identity of a person or an object).

The optical flow analyzer 240 can be configured to receive the set of images from the moving camera. The optical flow analyzer 240 can select a set of feature points in an image from the set of images. In some implementations, the optical flow analyzer 240 can select the set of feature points based on a texture (e.g., pattern, appearance, design, and/or the like) associated with each region of interest from the set of regions of interest in the image. In some implementations, the optical flow analyzer 240 can select the set of feature points randomly within each ROI from the set of ROIs in the image. In some implementations, the optical flow analyzer 240 can select the center of each ROI from the set of ROIs in the image as the set of feature points. In some implementations, the optical flow analyzer 240 can apply the edge, corner, blob, or ridge detectors to select the set of feature points.

The optical flow analyzer 240 can then define a moving direction of each feature point of the set of feature points. In some situations, a first subset of feature points from the set of feature points moves in a first direction, and a second subset of feature points from the set of feature points moves in a second direction different from the first direction. In this example, because the camera moves in the second direction, stationary objects in the video (e.g., buildings) appear to move uniformly in the first direction opposite to the second direction. Moving objects (e.g., a person or suspect) move in various non-uniform directions as the camera.

In some implementations, the optical flow analyzer 240 can determine a number of feature points of the first set of feature points that moves in the first direction and a number of feature points of the second set of feature points that move in the non-uniform directions. A set of feature points that is associated with the background of an image (i.e., moves uniformly in an opposite direction from the camera) often has a greater number of feature points than a set of feature points that is associated with the foreground of the image (i.e., moves in various non-uniform directions and lengths). In other words, when the number of feature points of the first set of feature points is greater than the number of feature points of the second set of feature points, the optical flow analyzer 240 can determine that the first set of feature points is associated with the background and the second set of feature points is associated with one or more foreground objects. Additionally, because the movement of the first set of feature points is substantially uniform and the movement of the second set of feature points is substantially non-uniform, the optical flow analyzer 240 can identify the first set of feature points as background and the second set of feature points as foreground objects. The optical flow analyzer 240 can alter the ROIs associated with each feature point from the second set of feature points to produce an altered image to protect privacy-related information included in the region of interest associated with each feature point from the second set of feature points. The optical flow analyzer 240 can send the altered image to the communications interface 290 or store the altered image in a standardized format.

In some implementations, the optical flow analyzer 240 can define a grid (not shown) placed over and/or overlaid on each image from the set of images. The grid includes a set of grid cells (not shown) and the optical flow analyzer 240 can select a center of each grid cell from the set of grid cells to define the set of feature points. The grid can be in a regular shape or an irregular shape. The grid can be orthogonal or perspective. The size of each grid cell can be substantially the same or different, or arbitrarily chosen to suit a given environment. The optical flow analyzer 240 can define a trajectory associated with each grid cell from the set of grid cells and determine a set of characteristics associated with the trajectory of each grid cell. The set of characteristics can include a length of a trajectory, a moving direction of the trajectory, and/or the like. When the set of characteristics associated with a first set of grid cells is less coherent than the set of characteristics associated with a second set of grid cells, the ROIs associated with the first set of grid cells are more likely to be associated with an identity of a person.

For example, in some situations, the closer an object (or a person) is to the camera, the longer the trajectory. In other words, when the length of the trajectory of the second set of feature points (e.g., 138 in FIG. 1B) is greater than the length of the trajectory of the first set of feature points (e.g., 139 in FIG. 1B), the optical flow analyzer 240 can determine and/or infer that the second set of feature points is closer to the camera than the first set of feature points. Thus, the second set of feature points is more likely to be associated with a foreground object (e.g., a person or vehicle). The optical flow analyzer 240 can alter the ROIs associated with the second set of feature points to produce the altered image to protect privacy-related information included in the ROIs associated with the second set of feature points. In some embodiments, the object detector 250 can detect a person, a face, or an object using machine learning techniques. For example, the object detector 250 can define a machine learning model and train the machine learning model using a set of parameters and/or data that include manually marked and/or annotated ROIs in a set of sample images of, for example, a person, a face, and/or an object. Such parameters can be used to optimize the machine learning model. Based on the machine learning model and the set of parameters, the object detector 250 can automatically detect certain features in an image as a person, a face, or an object. Once detected, the object detector 250 can track such features in the set of images of the video and alter these feature to produce an altered set of images. The object detector 250 can calculate the confidence score of privacy protection and determine if the confidence score meets a predefined criterion.

In some implementations, the object detector 250 can detect if a ROI is associated with an object of interest based at least in part on a physical motion limit of the object of interest. For example, if a feature in the ROI moves quickly to a height of 80 feet (i.e., as movement is monitored between the set of images), the object detector 250 can determine that the feature is in not associated with a person or car because a person or car is not able to jump to a height of 80 feet.

In some embodiments, two or more of the geometry detector 230, the optical flow analyzer 240, and/or the object detector 250 can detect privacy-related information in the same video file to improve the reliability of the privacy protection in different use cases. For example, each of the geometry detector 230, the optical flow analyzer 240, and the object detector 250 can calculate a confidence score of privacy protection and determine if the confidence score meets a predefined criterion. If the confidence score meets the predefined criterion, the scrambler 260 can alter the ROIs to produce an altered set of images such that the privacy-related information associated with the ROIs is protected. In some implementations, the confidence score of privacy protection can be a numerical value indicating a likelihood of all or a portion of privacy-related information in the video is protected. For example, a confidence score of 80% indicates that the likelihood of having no privacy-related information remaining in the video is 80%. The confidence score can be calculated based on a set of sample images and manually defined confidence score of each sample image of the set of sample images.

In some embodiments, the scrambler 260 can alter (or blur, scramble, pixelate, blank) the ROI (or only a portion of the ROI, such as the face of the person) that each of the geometry detector 230, the optical flow analyzer 240, and the object detector detected to remove any privacy-related information in the ROI. The scrambler 260 can generate an altered image and send the altered image to the communications interface 290, such that privacy associated with the identity of the person is protected.

FIG. 3 is a flow chart illustrating a geometry-based privacy-protective data management method 300, according to an embodiment. The geometry-based privacy-protective data management method 300 can be executed at, for example, a privacy-protective data management controller such as the privacy-protective data management controller 100 shown and described with respect to FIGS. 1A-1C or the privacy-protective data management controller 205 shown and described with respect to FIG. 2. More specifically, the geometry-based privacy-protective data management method 300 can be executed by a processor, such as processor 210 of controller 205 shown and described with respect to FIG. 2.

A moving or a non-moving camera (not shown) records a video that includes a set of images as well as, in some implementations, audio data and metadata (not shown) associated with the set of images. At 302, method 300 includes receiving a set of images associated with a video recorded by the moving or the non-moving camera. Based on a geometry of each region of interest ("ROI") from a set of regions of interest in an image from the set of images, method 300 protects privacy-related information associated with the image that may reveal an identity of a person or an object.

At 304, the privacy-protective data management controller (such as the privacy-protective data management controller 205 in FIG. 2) detects a structure (or edges, textures) of a region of interest from the set of regions of interest in the image. Background structures such as buildings, cars, roads, and/or the like differ in their geometry to the structure of humans and animals. For example, background structures such as buildings, cars, roads, and/or the like often have substantially straight lines, while the structure of humans and animals often does not have substantially straight lines. At 306, the privacy-protective data management controller classifies the structure of each region of interest into a geometric class from a set of predefined geometric classes. For example, when the privacy-protective data management controller detects a ROI comprising a set of substantially straight lines the privacy-protective data management controller can classify the ROI as a background. When the privacy-protective data management controller detects a ROI comprising a set of substantially non-structured lines), controller can classify the ROI as a foreground (or a target, or a human).

At 308, when the geometric class of an ROI is associated with an identity of a person (or an object), the privacy-protective data management controller alters (or blurs, scrambles, pixelates, blanks) the ROI (or only the face of the person via face detection algorithms), at 312, to remove any privacy-related information in the ROI and generate an altered image, such that privacy associated with the identity of the person is protected. At 314, the privacy-protective data management controller can send the altered image to a user interface or store the altered image in a standardized format.

In some implementations, when the set of images are recorded by the moving or the non-moving camera in a known environment (e.g., cities, or desert, or a ski resort), the privacy-protective data management controller can retrieve, from a memory operatively coupled with the privacy-protective data management controller, a set of predefined geometric classes associated with the known environment to facilitate with classifying the structure into a geometric class. In some implementations, the set of predefined geometric classes (e.g., humans, animals, buildings, and/or the like) can be defined using machine learning techniques. The privacy-protective data management controller can receive manual selections of geometric features from a set of sample images and classify the geometric features into at least one geometric class from the set of predefined geometric classes. The privacy-protective data management controller can define a machine learning model and train the machine learning model using a set of parameters and machine learning techniques. Based on the machine learning model and the set of parameters, the privacy-protective data management controller can automatically classify the structure in a ROI into a geometric class.

In some implementations, the privacy-protective data management controller can define a grid (not shown) overlaid on and/or placed over each image from. The grid includes a set of grid cells (e.g., ROIs 131-134 are examples of grid cells) and each grid cell from the set of grid cells can define and/or is associated with a different ROI from the set of ROIs in the image. The grid can be in a regular shape or an irregular shape. The grid can be orthogonal or perspective. The size of each grid cell can be substantially the same or different, or arbitrarily chosen to suit a given environment. The privacy-protective data management controller 100 can detect a structure of each ROI in each grid cell from the set of grid cells. The privacy-protective data management controller 100 can classify each grid cell into the set of predefined geometric classes using a set of parameters stored in the memory.

FIG. 4 is s flow chart illustrating an optical flow-based privacy-protective data management method 400, according to an embodiment. The optical flow-based privacy-protective data management method 400 can be executed at, for example, a privacy-protective data management controller such as the privacy-protective data management controller 100 shown and described with respect to FIGS. 1A-1C or the privacy-protective data management controller 205 shown and described with respect to FIG. 2. More specifically, the optical flow-based privacy-protective data management method 400 can be executed by a processor, such as processor 210 of controller 205 shown and described with respect to FIG. 2.

In some embodiments, a camera, moving in a direction, records a video that includes a set of images. In some implementations, the moving camera also record audio data and metadata. At 402, the privacy-protective data management controller receives the video and/or a set of images associated with a video recorded by the moving camera. As the camera moves in a first direction, a first set of feature points may appear to move in the first direction and a second set of feature points may appear to move in a second direction different from the first direction. Based on the motion of the first set of feature points relative to the motion of the second set of feature points, the privacy-protective data management controller 100 can be configured to protect privacy-related information associated with the image that may reveal an identity of a person or an object.

For example, in a situation when a camera is worn on a policeman (not shown) who is chasing a suspect, the camera, moving in a direction, records a video that includes a set of images. The privacy-protective data management controller receives the set of images from the moving camera. At 404, the privacy-protective data management controller selects a set of feature points in an image from the set of images. In some implementations, the privacy-protective data management controller selects the set of feature points based on a texture (e.g., pattern, appearance, design, and/or the like) associated with each region of interest from the set of regions of interest in the image. In some implementations, the privacy-protective data management controller selects the set of feature points randomly within each ROI from the set of ROIs in the image. In some implementations, the privacy-protective data management controller selects the center of each ROI from the set of ROIs in the image as the set of feature points. In some implementations, the privacy-protective data management controller can apply the edge, corner, blob, or ridge detectors to select the set of feature points.

At 406, the privacy-protective data management controller then defines a first moving direction of each feature point of the first set of feature points, and at 408, the privacy-protective data management controller defines a second moving direction of each feature point from the second set of feature points. In some situations, a first subset of feature points from the set of feature points moves in a first direction, and a second subset of feature points from the set of feature points moves in a second direction different from the first direction. In this example, because the camera moves in the second direction, stationary objects in the video (e.g., buildings) appear to move uniformly in the first direction opposite to the second direction. Moving objects (e.g., a person or suspect) move in various non-uniform directions as the camera.

In some implementations, the privacy-protective data management controller determines a number of feature points of the first set of feature points that moves in the first direction and a number of feature points of the second set of feature points that move in the non-uniform directions. A set of feature points that is associated with the background of an image (i.e., moves uniformly in an opposite direction from the camera) often has a greater number of feature points than a set of feature points that is associated with the foreground of the image (i.e., moves in various non-uniform directions and lengths). In other words, at 410, when the number of feature points of the first set of feature points is greater than the number of feature points of the second set of feature points, the privacy-protective data management controller determines that the first set of feature points is associated with the background and the second set of feature points is associated with one or more foreground objects. Additionally, because the movement of the first set of feature points is substantially uniform and the movement of the second set of feature points is substantially non-uniform, the privacy-protective data management controller identifies the first set of feature points as background and the second set of feature points as foreground objects. At 412, the privacy-protective data management controller alters the ROIs associated with each feature point from the second set of feature points to produce an altered image to protect privacy-related information included in the region of interest associated with each feature point from the second set of feature points. At 414, the privacy-protective data management controller sends the altered image to the communications interface or store the altered image in a standardized format. While described in FIG. 4 as being associated with a moving camera, in other embodiments, the technique shown and described with respect to FIG. 4 can be used with images received from a non-moving camera.

FIG. 5 is a flow chart illustrating a combined privacy-protective data management method 500, according to an embodiment. The combined privacy-protective data management method 500 can be executed at, for example, a privacy-protective data management controller such as the privacy-protective data management controller 100 shown and described with respect to FIGS. 1A-1C or the privacy-protective data management controller 205 shown and described with respect to FIG. 2. More specifically, the combined privacy-protective data management method 500 can be executed by a processor, such as processor 210 of privacy-protective data management controller 205 shown and described with respect to FIG. 2. In some embodiments, the privacy-protective data management controller can combine at least two of the optical flow-based embodiment illustrated with regards to FIG. 1B, the geometry-based embodiment illustrated with regards to FIG. 1A, and/or an object detector embodiment to improve the reliability of the privacy protection in different use cases.

For example, the privacy-protective data management controller receives a video or a set of images associated with a video recorded by a moving camera, at 502. The video (or a set of images associated with a video), recorded by a moving camera (not shown), can include non-moving and structured buildings, a set of structured cars moving in different directions, and a person of interest moving in a direction. The moving camera can be on a moving drone configured to record activities of the person of interest.

At 504, the privacy-protective data management controller detects, based on a characteristic associated with a person, a face, or an object, a first region of interest from the set of regions of interest and associate with an identity of a person. For example, the privacy-protective data management controller can define a machine learning model and train the machine learning model by manually marking certain ROIs in a set of sample images as a person, a face, or an object, and optimize a set of parameters associated with the machine learning model. Based on the machine learning model and the set of parameters, the privacy-protective data management controller can automatically detect certain features in an image as a person, a face, or an object. Once detected, at 506, the privacy-protective data management controller tracks such features in the set of images of the video and alter these feature to produce an altered set of images.

At 508, the privacy-protective data management controller defines a first moving direction of each feature point of the first set of feature points, and a second moving direction of each feature point from the second set of feature points. In some situations, a first subset of feature points from the set of feature points moves in a first direction, and a second subset of feature points from the set of feature points moves in a second direction different from the first direction. In some implementations, the privacy-protective data management controller determines a number of feature points of the first set of feature points that moves in the first direction and a number of feature points of the second set of feature points that move in the non-uniform directions. A set of feature points that is associated with the background of an image (i.e., moves uniformly in an opposite direction from the camera) often has a greater number of feature points than a set of feature points that is associated with the foreground of the image (i.e., moves in various non-uniform directions and lengths). In other words, when the number of feature points of the first set of feature points is greater than the number of feature points of the second set of feature points, the privacy-protective data management controller determines that the first set of feature points is associated with the background and the second set of feature points is associated with one or more foreground objects. Additionally, because the movement of the first set of feature points is substantially uniform and the movement of the second set of feature points is substantially non-uniform, the privacy-protective data management controller identifies the first set of feature points as background and the second set of feature points as foreground objects.

At 510, the privacy-protective data management controller detects a structure (or edges, textures) of a region of interest from the set of regions of interest in the image.

Background structures such as buildings, cars, roads, and/or the like differ in their geometry to the structure of humans and animals. For example, background structures such as buildings, cars, roads, and/or the like often have substantially straight lines, while the structure of humans and animals often does not have substantially straight lines. The privacy-protective data management controller classifies the structure of each region of interest into a geometric class from a set of predefined geometric classes and detects a fourth region of interest within the set of images and associated with the identity of a person (or an object)

At 512, the privacy-protective data management controller then alters (or blur, scramble, pixelate, blank) the first ROI, the second ROI, and/or the fourth ROI to remove any privacy-related information in the ROIs and generate an altered image, such that privacy associated with the identity of the person is protected. At 514, the privacy-protective data management controller sends the altered image to a user interface or store the altered image in a standardized format. While described in FIG. 5 as being associated with a moving camera, in other embodiments, the technique shown and described with respect to FIG. 5 can be used with images received from a non-moving camera.

In some embodiments, an apparatus includes a system to automatically or semi-automatically protect privacy while managing data generated with moving cameras. This can include (1) automatic detection of privacy-related information in the input data such as regions of interest (ROIs) in image frames, audio channels, or particular fragments of metadata, which might be relevant to revealing the identity of a person (e.g., face, body, license plate, color of clothing, voice, GPS coordinates, date and time), (2) a user interface, which allows a user to confirm or to correct these detections and to select additional fragments of information, which can be privacy protected, and (3) privacy protection of the information selected in (1) and (2).

According to some embodiments, the data management system includes a module that examines data integrity by inspecting the input data and searching for indications of tampering. Indexing of the data can be carried out in some embodiments to facilitate quick subsequent search at later use of the data. Another embodiment may include a system module, which provides a consistent output format and performs data compression to optimize the size of data to be stored.

Figure 6:
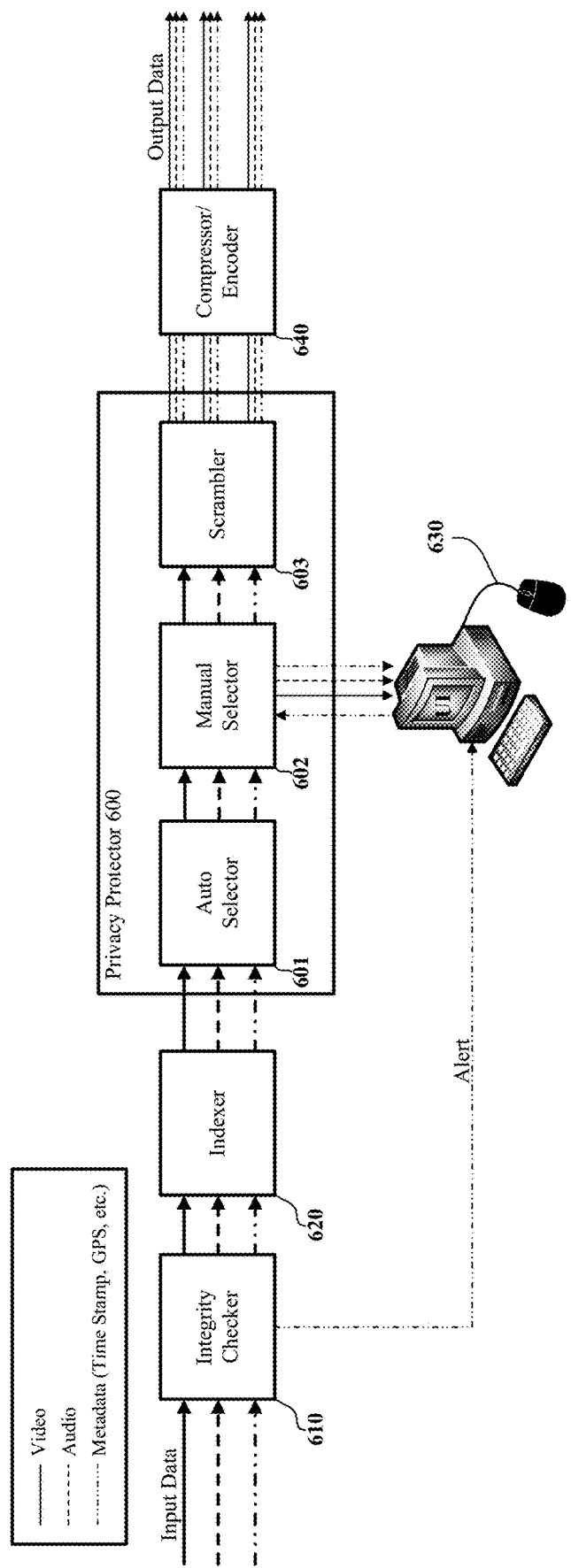
FIG. 6 is a block diagram illustrating a privacy-protective data management system, according to an embodiment.

Some embodiments described herein relate to a computer system as depicted in FIG. 6, wherein privacy protector 600 automatically or semi-automatically selects privacy-related information in data generated with moving cameras and provides privacy protection to persons by scrambling the selected information fragments. The privacy protector 600 is structurally and functionally similar to the privacy-protective data management controller described with regards to FIGS. 1A-1C and FIG. 2. Apart from its main privacy protecting functionality, in some embodiments the system can provide additional data management services such as integrity check (integrity checker 610), indexing (indexer 620), data compression and format uniformization (compressor/encoder 640).

Metadata generated through the apparatus can further be used for other functionality such as search on metadata, behavior extraction and general description extraction (height estimates, clothing color estimates). Further, events and/or alerts can be defined and generated automatically based on this metadata.

In some embodiments, the privacy protector 600 can be hardware and/or software (implemented in hardware such as a processor). A system implementing the privacy protector 600 can include a processor and a memory storing code representing instructions to execute the privacy protector 600. Additional modules and/or components described herein can include code stored in the memory be executed by the processor.

Some embodiments described herein relate to a system described above where privacy protection is carried out either in substantially real-time simultaneously while data is being captured or posteriorly on stored data. Some embodiments described herein automatically select privacy-related visual information in videos from moving cameras by separating background and foreground regions (e.g., as described above) in auto selector 601. For example, auto selector 601 can receive video data associated with one or more images, can separate the background and the foreground, can identify privacy-related information (e.g., data and/or portions of the image to protect and/or obscure) in the foreground and can output the data associated with the separated background and foreground and/or the privacy-related information.

In some instances, foreground regions contain privacy sensitive information. Accurate separation of background and foreground regions can be a challenging task in case of moving cameras, because the three-dimensional (3D) structure of the scene is reconstructed based on the two-dimensional (2D) input data to distinguish between image pixels that are moving due to camera motion and pixels that are actually moving relative to the scene background (i.e. belonging to independently moving objects).

Some embodiments described herein use information about the scene geometry in the image frames of videos to do the above-mentioned background/foreground separation. One method of obtaining this information is as follows.

A grid is defined over the input video (as described above). Depending on the type and use case of the moving camera, this grid can be orthogonal/perspective, regular/irregular, etc. and the size of grid cells may also be chosen arbitrarily to suit the given scenario.

Feature points are selected in each grid cell. This selection can be made either by applying edge, corner, blob, or ridge detectors, or simply by choosing the geometrical center of each grid cell.

The optical flow is computed based on the previously selected feature points.

One or more trajectories are generated in each grid cell. "Active" grid cells are selected based on the previously generated trajectories. The activation criteria may differ depending on the use case of the moving camera. For example, when a cell's trajectory moves against the grid-wide average trajectory motion, that cell should be activated. Inactive cells are considered as background and the result is a sparse separation of background and foreground regions.

Segmentation is performed in each active grid cell, thereby selecting the foreground segment of the cell. The result of this pixel-wise operation is a refined separation of background and foreground regions, where the foreground is considered to be the privacy sensitive fragment of the image frame.

Some embodiments described herein can further enhance foreground extraction by taking advantage of the parallax effect (i.e., that objects close to the camera appear to be moving faster than objects farther away from the camera). Some embodiments described herein can use object or person detectors of auto selector 601 to fine-tune the selection of privacy sensitive image regions based on foreground extraction. Some embodiments described herein can further enhance the accuracy of privacy-related region selection with the help of tracking detected objects, persons, or faces using auto selector 601.

Some embodiments described herein can use additional data in auto selector 601 collected by auxiliary sensors of a moving camera to automatically select privacy-related information in the input data. For example, the depth information from an infrared sensor of an Red Green Blue Depth ("RGBD") camera may significantly boost the accuracy of foreground extraction.

Some embodiments described herein can automatically select privacy-related information in the audio channels of the input data by using diarization in auto selector 601. Some embodiments described herein automatically select privacy-related information in the audio channels of the input data by using median filtering and factorization techniques in auto selector 601. Some embodiments described herein automatically select privacy-related information in the audio channels of the input data by using machine learning techniques in auto selector 601 (as described above).

Some embodiments described herein automatically select privacy-related information in the input metadata by applying artificial intelligence methods in auto selector 101. The artificial intelligence agent selects fragments of the metadata based on their privacy-sensitivity in the given scenario.

Some embodiments described herein automatically select privacy-related information in the input metadata by using data mining in auto selector 601. Some embodiments described herein automatically select privacy-related information in the input data in auto selector 601 and provide the opportunity to a user to manually modify the selection using manual selector 602 through the user interface 630. In some scenarios, certain modifications can be made in the automatic selection of privacy-related information provided by auto selector 601. These modifications can be correction, addition, or removal of privacy-related information fragments.

For example, the manual selector 602 can receive privacy-related information from the auto selector 601. The manual selector 602 can present the privacy-related information (and the remaining portions of an image or video) to a user via the user interface 630. This can allow a user to select other portions of the video and/or image to protect and/or obscure. The manual selector 602 can then receive a signal from the user interface 630 indicating other portions of the video and/or image to protect and/or obscure. The information associated with the portions of the video and/or image to protect and/or obscure can then be sent to the scrambler 603.

Some embodiments described herein protect privacy by scrambling video data in scrambler 603. For example, the scrambler 603 can receive the information associated with the portions of the video and/or image to protect and/or obscure from the manual selector 602 (or the auto selector 601). The scrambler 603 can then process the portions of the video and/or image to protect and/or obscure such portions, as described herein. The scrambler 603 can then send the modified video and/or image (or image data) to the compressor/encoder 640.

In some implementations, the scrambler 603 can protect privacy by scrambling video data by blurring ROIs previously selected by auto selector 601 and/or manual selector 602 or whole image frames. Some implementations described herein protect privacy by scrambling video data in scrambler 603 by pixelating ROIs previously selected by auto selector 601 and/or manual selector 602 or whole image frames. Some implementations described herein protect privacy by scrambling video data in scrambler 603 by blanking ROIs previously selected by auto selector 601 and/or manual selector 602 or whole image frames. Some implementations described herein protect privacy by scrambling video data in scrambler 603 by in-painting ROIs previously selected by auto selector 601 and/or manual selector 602 or whole image frames.

Some implementations described herein protect privacy by scrambling video data in scrambler 603 by replacing objects and people with their silhouettes in ROIs previously selected by auto selector 601 and/or manual selector 602 or in whole image frames. Some implementations described herein protect privacy by scrambling video data in scrambler 603 by applying JPEG-masking to ROIs previously selected by auto selector 601 and/or manual selector 602 or to whole image frames. Some implementations described herein protect privacy by scrambling video data in scrambler 603 by warping ROIs previously selected by auto selector 601 and/or manual selector 602 or whole image frames. Some implementations described herein protect privacy by scrambling video data in scrambler 603 by morphing ROIs previously selected by auto selector 601 and/or manual selector 602 or whole image frames. Some implementations described herein protect privacy by scrambling video data in scrambler 603 by cartooning ROIs previously selected by auto selector 601 and/or manual selector 602 or whole image frames.

Some implementations described herein protect privacy by scrambling video data in scrambler 603 by applying various computer vision or image/video processing methods to ROIs previously selected by auto selector 601 and/or manual selector 602 or to whole image frames. Some implementations described herein protect privacy by scrambling previously selected fragments of audio data in scrambler 603 by applying various audio effects such as pitch shifting, etc. Some implementations described herein protect privacy by scrambling or erasing previously selected fragments of metadata in scrambler 603.

According to some implementations, privacy protector 600 can output multiple data streams providing various privacy-levels depending on the target utilization of the output data. For example, if the output data is planned to be used publicly, each and every person's privacy can be protected; if it is used as a forensic evidence, only the privacy of persons not involved in the incident is protected; users authorized having full access to the raw data can obtain unprotected output. The definition of different privacy-levels can be role and scenario dependent.

Some embodiments described herein can include integrity checker 610, which performs an integrity check on the input data to determine whether the data has been tampered with. This integrity check can be performed, for example, by examining time stamps, correctness of video encoding, pixel-relations in video, and/or the like. For example, the integrity checker 610 can receive input data, can identify a source, time, checksum and/or other characteristics associated with the input data. This can be compared against an indication of expected input data to determine whether the data has been modified. The integrity checker can then provide the input data to the indexer 620. In some instances, if an error is found by the integrity checker 610, the integrity checker 610 can send an indication to a user (e.g., over a network and/or using the user interface 630).

Some embodiments described herein can include indexer 620, which performs indexing on the input data thereby generating additional metadata based on the content, which helps in conducting subsequent searches. This metadata can be for instance an activity index based on difference images, selected key-frames based on event detection, a textual representation of visual data, and/or the like. For example, the indexer 620 can receive data from the integrity checker 610, can perform the indexing on the data and generate the additional metadata, and can send the data and the additional metadata to the privacy protector 600.

Some embodiments described herein can include compressor/encoder 640, which provides effective data compression and encodes output data in a consistent format. For example, the compressor/encoder 640 can receive protected data from the privacy protector 600 and can compress and/or encode the data. The compressor/encoder 640 can then send the data (e.g., output data) to a destination device (e.g., database, server, user interface, etc.), for example, over a network.

According to some implementations, compressor/encoder 640 can use audio coding formats such as MPEG-1 or MPEG-2 Audio Layer III, Vorbis, Windows Media Audio, Pulse-code modulation, Apple Lossless Audio Codec, Free Lossless Audio Codec, Money's Audio, OptimFROG, Tom's verlustfreier Audiokompressor, WavPack, TrueAudio, Windows Media Audio Lossless, and/or the like. According to some implementations, compressor/encoder 640 can use video coding formats such as Apple QuickTime RLE, Dirac lossless, FastCodec, FFV1, H.264 lossless, JPEG 2000 lossless, VP9, Cinepak, Dirac, H.261, MPEG-1 Part 2, H.262/MPEG-2 Part 2, H.263, MPEG-4 Part 2, H.264/MPEG-4 AVC, HEVC, RealVideo, Theora, VC-1, Windows Media Video, MJPEG, JPEG 2000, DV, H.265, and/or the like.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

For example, some embodiments can perform indexing (indexer 620) before the integrity check (integrity checker 610), do not include some components and/or modules such as integrity checker 610, indexer 620, and/or compressor/encoder 640, and/or do not provide manual modification possibilities through manual selector 602 and/or user interface 630, but function in a fully automatic way.

In some embodiments, a method includes automatically or semi-automatically protecting privacy while managing data generated with moving cameras. Privacy-related information can be automatically or semi-automatically selected in the input data based on, for example, foreground extraction by using scene geometry; background subtraction while considering motion information extracted from the image and/or additional sensors; using object or people detectors; tracking objects, persons, or faces; and/or using data from multiple sensors in the same device.

In some implementations, privacy protection can be performed on information fragments, objects of interest, and/or other portions of an image and/or video automatically selected. In such implementations, the privacy can be protected by blurring selected ROIs or whole image frames of the video data; pixelating selected ROIs or whole image frames of the video data; blanking selected ROIs or whole image frames of the video data; in-painting selected ROIs or whole image frames of the video data; replacing objects and people with their silhouettes in selected ROIs or whole image frames of the video data; applying JPEG-masking to selected ROIs or whole image frames of the video data; warping selected ROIs or whole image frames of the video data; morphing selected ROIs or whole image frames of the video data; cartooning selected ROIs or whole image frames of the video data; applying various computer vision or image/video processing methods to selected ROIs or whole image frames of the video data; and/or the like.

In some implementations, privacy-related information is automatically selected in audio data by using diarization, median filtering and factorisation techniques, machine learning techniques, and/or the like. In some implementations, privacy is protected by distorting selected parts of the audio data by applying various audio effects such as, for example, pitch shifting and/or the like. In some implementations, privacy-related information is automatically selected in metadata by applying artificial intelligence methods, using data mining and/or the like. In some implementations, privacy is protected by scrambling or erasing selected fragments of the metadata.

In some implementations, privacy-related information is manually selected in the input data by a user through a user interface. In some implementations, the automatic selection of privacy-related information is manually modified by a user through a user interface.

In some implementations, integrity of input data is exampled by, for example, examining time-stamps, correctness of video encoding, or pixel-relations in video, and/or the like. In some implementations, the input data is processed by an indexer in order to help subsequent search. Such indexing can be carried out by, for example, selecting key-frames, generating an activity index based on optical flow, providing a textual representation of visual data based on some artificial intelligence, and/or the like. In some implementations, the output data can be compressed in an optimized manner and encoded in a consistent format.

Due to the possibilities offered by modern technology, an enormous amount of data circulate extremely fast around the globe particularly through video sharing services and social networks on the Internet where camera generated data also appears frequently. The original source and the lifecycle of the data are mostly unknown, which makes the data unreliable. When the data from moving cameras is used, for example, as forensic evidence, this unreliability and the lack of data integrity is especially critical. Thus, there is a need for methods determining whether data integrity is ensured from capturing the data with a moving camera until its consumption.

Moreover, in certain situations, quickly identifying particular information in the data generated by moving cameras can be beneficial. To support such a fast search, the data management system can include a module that performs indexing on the input data. This indexing can be carried out through an arbitrary method, which is able to generate an abstract representation of the input data in which searching is more efficient and user friendly.

The inconsistent use of various data formats and non-optimal data compression may lead to serious issues while using and storing the data generated with moving cameras. Therefore, the data management system can include a module that provides the output in a consistent format and in optimal size.

The privacy-protective data management controller can be configured to include a manual (fine-tuning, tweaking) component, which can use the manual input as a feedback/ training data for the automatic algorithm. The automatic algorithm can have a machine learning module in it thereby adapting its settings to the current scene/scenario.

Although various embodiments have been described as having particular features and/or combinations of components, other embodiments are possible having a combination of any features and/or components from any of embodiments as discussed above. For example, instead of selecting certain information fragments of the input data based on their relation to privacy, selection can be made based on other arbitrary requirements. Furthermore, instead of protecting privacy by scrambling selected privacy-related information, selected information fragments and/or objects of interest can be highlighted, extracted, or processed in an arbitrary manner.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, C#, F#, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
a memory; and
a processor operatively coupled to the memory, the processor configured to:
receive a set of images associated with a video recorded by a camera,
detect a structure of a region of interest from a plurality of regions of interest in an image from the set of images,
classify the structure into a geometric class from a set of predefined geometric classes,
alter the region of interest to generate an altered image when the geometric class is associated with an identity of a person, such that privacy associated with the identity of the person is protected, and
at least one of send the altered image to a user interface or store the altered image in a standardized format;
wherein the processor is configured to classify the structure into the geometric class based on detecting the structure of the region of interest as including a set of substantially straight lines, the geometric class being associated with a background and not associated with the identity of the person.

2. The apparatus of claim 1, wherein the processor is configured to:
define a grid placed over the set of images, the grid including a plurality of grid cells, each grid cell from the plurality of grid cells associated with a different region of interest from the plurality of regions of interest in the image,
detect a structure of each region of interest in each grid cell from the plurality of grid cells, and
classify each grid cell into the set of predefined geometric classes using a set of parameters stored in the memory.

3. The apparatus of claim 1, wherein the processor is configured to alter the region of interest by scrambling the region of interest.

4. The apparatus of claim 1, wherein the geometric class is associated with the identity of the person based on the region of interest being substantially non-structured.

5. The apparatus of claim 1, wherein the processor is configured to classify the structure into the geometric class using a set of parameters stored in the memory,
the set of parameters is generated by manually selecting geometric features from a set of sample images and classifying the geometric features into at least one geometric class from the set of predefined geometric classes.

6. The apparatus of claim 1, wherein the set of images are recorded by the camera in a known environment.

7. The apparatus of claim 1, wherein the set of images is associated with audio data.

8. A non-transitory processor-readable medium storing code representing instructions to be executed by a processor, the code comprising code to cause the processor to:
receive a set of images associated with a video recorded by a camera;
detect a structure of a region of interest from a plurality of regions of interest in an image from the set of images;
classify the structure into a geometric class from a set of predefined geometric classes;
alter the region of interest to generate an altered image when the geometric class is associated with an identity of a person, such that privacy associated with the identity of the person is protected; and at least one of send the altered image to a user interface or store the altered image in a standardized format;

wherein the processor is configured to classify the structure into the geometric class based on detecting the structure of the region of interest as including a set of substantially straight lines, the geometric class being associated with a background and not associated with the identity of the person.

9. The non-transitory processor-readable medium of claim 8, wherein the code further comprises code to cause the processor to:

define a grid placed over the set of images, the grid including a plurality of grid cells, each grid cell from the plurality of grid cells associated with a different region of interest from the plurality of regions of interest in the image;

the code to cause the processor to detect includes code to cause the processor to detect a structure of each region of interest in each grid cell from the plurality of grid cells; and the code to cause the processor to classify includes code to the cause the processor to classify each grid cell into the set of predefined geometric classes using a set of parameters stored in the memory.

10. The non-transitory processor-readable medium of claim 8, wherein the code to cause the processor to alter includes code to cause the processor to:

alter the region of interest by scrambling the region of interest.

11. The non-transitory processor-readable medium of claim 8, wherein the geometric class is at least one of (1) associated with a background and not associated with the identity of the person based on the structure of the region of interest being detected as a set of substantially straight lines, or (2) associated with the identity of the person based on the region of interest being detected as substantially non-structured.

12. The non-transitory processor-readable medium of claim 8, wherein the code to cause the processor to classify includes code to cause the processor to classify the structure into the geometric class using a set of parameters stored in the memory, the set of parameters being generated by manually selecting geometric features from a set of sample images and classifying the geometric features into at least one geometric class from the set of predefined geometric classes.

13. The non-transitory processor-readable medium of claim 8, wherein the set of images are recorded by the camera in a known environment.

14. The non-transitory processor-readable medium of claim 8, wherein the set of images is associated with audio data.

15. A method, comprising:

receiving a set of images associated with a video recorded by a camera;

detecting a structure of a region of interest from a plurality of regions of interest in an image from the set of images;

classifying the structure into a geometric class from a set of predefined geometric classes;

scrambling the region of interest to generate an altered image when the geometric class is associated with an identity of a person, such that privacy associated with the identity of the person is protected; and at least one of sending the altered image to a user interface or storing the altered image;

wherein the processor is configured to classify the structure into the geometric class based on detecting the structure of the region of interest as including a set of substantially straight lines, the geometric class being associated with a background and not associated with the identity of the person.

16. The method of claim 15, further comprising:

defining a grid placed over the set of images, the grid including a plurality of grid cells, each grid cell from the plurality of grid cells associated with a different region of interest from the plurality of regions of interest in the image, the detecting including detecting a structure of each region of interest in each grid cell from the plurality of grid cells; and the classifying including classifying each grid cell into the set of predefined geometric classes using a set of parameters stored in the memory.

17. The method of claim 15, wherein the geometric class is at least one of (1) associated with a background and not associated with the identity of the person when the structure of the region of interest is a set of substantially straight lines, or (2) associated with the identity of the person when the region of interest is substantially non-structured.

18. The apparatus of claim 1, wherein the processor is configured to classify the structure into the geometric class based on detecting the structure of the region of interest as being substantially non-structured, the geometric class being associated with the identity of the person.

19. The apparatus of claim 1, wherein the structure includes at least one of an edge or a texture.

20. The apparatus of claim 1, wherein the processor is configured to:

define a grid placed over the set of images, the grid including a plurality of grid cells, each grid cell from the plurality of grid cells associated with a different region of interest from the plurality of regions of interest in the image, detect a structure within in each grid cell from the plurality of grid cells, the structure being one or more substantially straight lines or one or more substantially non-structured lines, and classify each grid cell from the plurality of grid cells into a geometric class from the set of predefined geometric classes using a set of parameters stored in the memory and based on the structure detected in that grid cell.

21. The non-transitory processor-readable medium of claim 8, wherein the code further comprises code to cause the processor to:

define a grid placed over the set of images, the grid including a plurality of grid cells, each grid cell from the plurality of grid cells associated with a different region of interest from the plurality of regions of interest in the image, detect a structure within in each grid cell from the plurality of grid cells, the structure being one or more substantially straight lines or one or more substantially non-structured lines, and classify each grid cell from the plurality of grid cells into a geometric class from the set of predefined geometric classes using a set of parameters stored in the memory and based on the structure detected in that grid cell.

22. The method of claim 15, further comprising:

defining a grid placed over the set of images, the grid including a plurality of grid cells, each grid cell from the plurality of grid cells associated with a different region of interest from the plurality of regions of interest in the image, detecting a structure within in each grid cell from the plurality of grid cells, the structure being one or more substantially straight lines or one or more substantially non-structured lines, and classifying each grid cell from the plurality of grid cells into a geometric class from the set of predefined geometric classes using a set of parameters stored in the memory and based on the structure detected in that grid cell.

* * * * *